United States Patent
Hidding

(10) Patent No.: US 8,850,961 B2
(45) Date of Patent: Oct. 7, 2014

(54) BEVERAGE MAKER HAVING A WATER RESERVOIR AND A MEMBER FOR DETERMINING A SIZE OF AN OUTLET OPENING OF THE WATER RESERVOIR

(75) Inventor: Elze Deodaat Hidding, Hoogeveen (NL)

(73) Assignee: Koninklijke Philips N.V., Eindhoven (NL)

( * ) Notice: Subject to any disclaimer, the term of this patent is extended or adjusted under 35 U.S.C. 154(b) by 1164 days.

(21) Appl. No.: 12/601,319

(22) PCT Filed: May 26, 2008

(86) PCT No.: PCT/IB2008/052061
§ 371 (c)(1),
(2), (4) Date: Jun. 14, 2010

(87) PCT Pub. No.: WO2008/146233
PCT Pub. Date: Dec. 4, 2008

(65) Prior Publication Data
US 2010/0242739 A1    Sep. 30, 2010

(30) Foreign Application Priority Data
May 31, 2007   (EP) ..................................... 07109265

(51) Int. Cl.
*A47J 31/00* (2006.01)
*A47J 31/44* (2006.01)

(52) U.S. Cl.
CPC .................................. *A47J 31/4475* (2013.01)
USPC .................................. 99/299; 99/305; 99/306

(58) Field of Classification Search
USPC .................... 99/305, 299, 306, 304, 307, 315
See application file for complete search history.

(56) References Cited

U.S. PATENT DOCUMENTS

| | | | | |
|---|---|---|---|---|
| 3,423,209 | A | * | 1/1969 | Weber ............................. 426/433 |
| 4,165,681 | A | * | 8/1979 | Belinkoff ......................... 99/280 |
| 4,376,447 | A | | 3/1983 | Chumley |
| 4,819,553 | A | * | 4/1989 | Heyn et al. ...................... 99/305 |
| 4,920,869 | A | * | 5/1990 | Landais ........................... 99/283 |
| 5,067,395 | A | * | 11/1991 | Timm ............................. 99/282 |
| 5,287,796 | A | * | 2/1994 | Timm ............................. 99/282 |
| 6,557,584 | B1 | | 5/2003 | Lucas et al. |

FOREIGN PATENT DOCUMENTS

| | | | |
|---|---|---|---|
| DE | 4401722 A1 | 7/1995 | |
| FR | 2628963 | * 9/1989 | ..................... 99/306 |
| GB | 828530 A | 2/1960 | |
| GB | 1463009 A1 | 2/1977 | |
| JP | 58188413 A | 11/1983 | |
| JP | 62270117 A | 11/1987 | |
| JP | 09117372 A | 5/1997 | |
| WO | 9610355 A1 | 4/1996 | |
| WO | 9633643 A1 | 10/1996 | |

* cited by examiner

Primary Examiner — Reginald L Alexander

(57) ABSTRACT

A beverage marker comprises a water reservoir (1) and a beverage extract holder (2) which is adapted to accommodate an amount of beverage extract, whether contained in a filter or not, which is suitable for containing an amount of fluid, which has at least one outlet opening (4) for letting out beverage, and which is arranged at a position for receiving water from an outlet opening (3) of the water reservoir (1). Furthermore, the beverage maker comprises a movably arranged water flow restriction member (6) which is mechanically connected to the beverage extract holder (2), such that an increasing weight of the beverage extract holder (2) causes an increasing restriction of the outlet opening (3) of the water reservoir (1). If so required, the outlet opening (3) of the water reservoir (1) may be completely blocked in order to prevent the beverage extract holder (2) from overflowing.

6 Claims, 1 Drawing Sheet

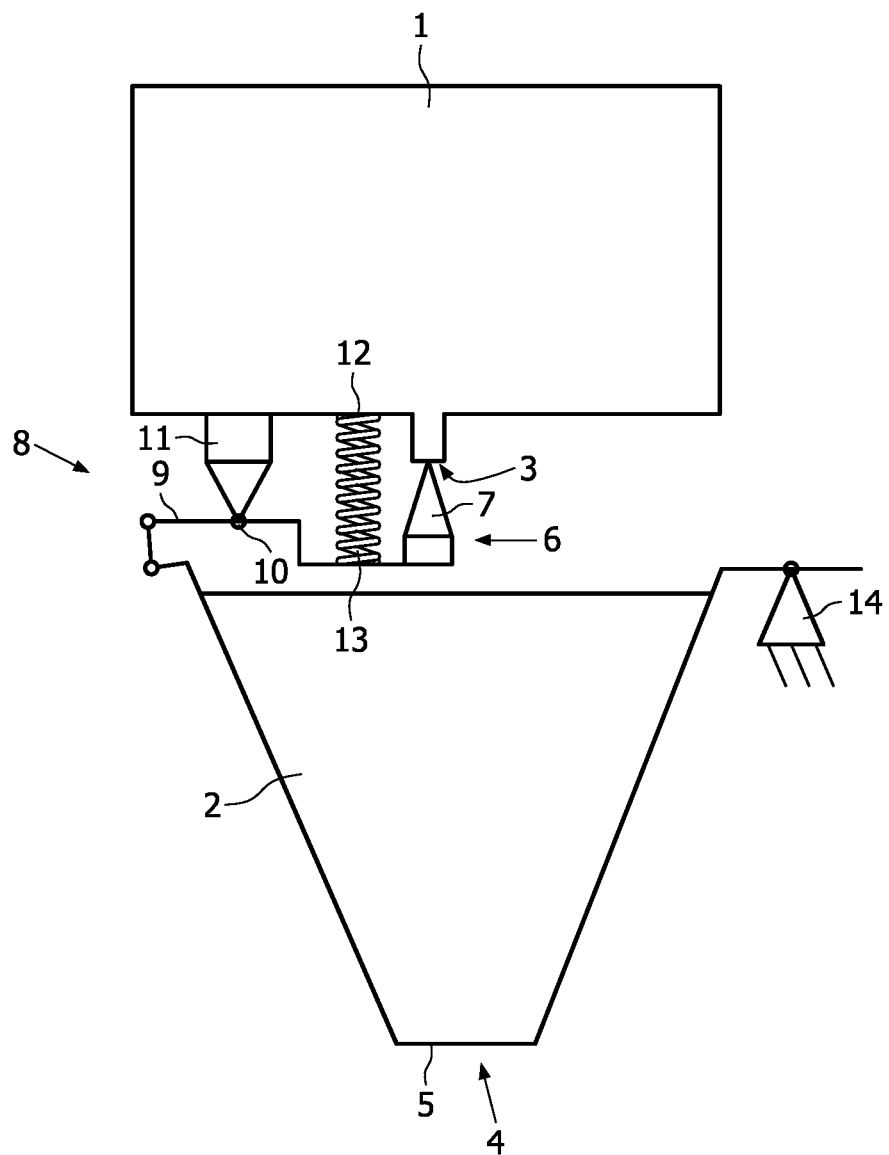

BEVERAGE MAKER HAVING A WATER RESERVOIR AND A MEMBER FOR DETERMINING A SIZE OF AN OUTLET OPENING OF THE WATER RESERVOIR

FIELD OF THE INVENTION

The present invention relates to a device for making a beverage, comprising a water reservoir having at least one outlet opening for letting out water; and a beverage extract holder which is intended to be filled with an amount of beverage extract, whether contained in a filter or not, which is suitable for containing an amount of fluid, which has at least one outlet opening for letting out beverage, and which is arranged at a position for receiving water from the outlet opening of the water reservoir.

BACKGROUND OF THE INVENTION

A beverage maker comprising a water reservoir and a beverage extract holder is well-known. For example, the beverage maker may be a coffee maker which is adapted to make hot coffee on the basis of water and an amount of coffee extract in the form of ground coffee beans, and which comprises heating means for heating water that is present in the water reservoir. Furthermore, the coffee extract may be provided in a disposable filter, wherein it is appropriate to denote the beverage extract holder as filter holder. In general, when the coffee maker is operated for the purpose of making coffee, steps as described in the following are taken.

In the first place, a user of the coffee maker performs preparatory actions. In particular, the user fills a disposable filter with an appropriate amount of coffee extract and places the filter in the beverage extract holder. Also, the user takes care that the water reservoir of the coffee maker is filled with a sufficient amount of water.

In respect of the filter holder, it is noted that embodiments of a coffee maker exist in which the filter holder is removably arranged in the coffee maker, wherein it is furthermore possible that a portion of a housing which is adapted to receive and hold the filter holder is pivotably arranged. In such a case, the step of placing a filter filled with an amount of coffee in the filter holder is preceded by pivoting the housing portion as mentioned to a position in which the housing is opened, and in which the filter holder is freely accessible. In the process, the user may decide to remove the filter holder from the housing portion for the purpose of placing the filter in the filter holder, and subsequently put the filter holder back in place in the housing portion. In any case, when the coffee maker comprises a pivotably arranged housing portion as mentioned, and the assembly of the filter holder and the filter is in place in the housing portion, the user puts the filter holder and the filter in an operative position in the coffee maker by pivoting the housing portion to a position in which the housing is closed.

After the preparatory actions have been completed, the user activates the coffee maker, wherein the heating means are switched on and heat the water. The hot water drips from the outlet opening of the water reservoir and is received in the filter. It is noted that it is possible that the entire water reservoir is positioned above the filter holder, but that this is not necessary. For example, in alternative embodiments of a coffee maker, a major part of the water reservoir is positioned at a more or less equal level than the filter holder, and the water reservoir comprises an outlet tube, wherein only an end of the tube having the outlet opening is positioned above the filter holder.

The coffee is obtained as a result of an interaction between the hot water and the amount of coffee extract which is present in the filter. In particular, the water moves through the amount of coffee extract, under the influence of gravity, wherein it is possible that additionally a pressure is applied. The coffee exits the filter holder through the outlet opening of the filter holder.

In practice, when the coffee maker as described in the foregoing is used, various problems may occur. Among other things, these problems are related to the fact that the outlet opening of the water reservoir is a narrow opening which is apt to get clogged. In the first place, it is possible that the outlet opening of the water reservoir gets clogged with scale particles and/or other contaminating particles, so that it takes a relatively long time for an appropriate amount of water to flow from the water reservoir to the filter holder. Furthermore, as a result, the taste of the coffee is badly influenced. In the second place, the outlet opening of the filter holder may be clogged with dirt, or blocked by the filter in some way. When this happens, not only is it annoying to a user that it takes a long time for the coffee to come out of the coffee maker, or that this does not happen at all, but there is a considerable chance that the filter holder overflows as a consequence of a larger inflow of water in the filter holder than an outflow of beverage from the filter holder. Overflow of the filter holder may also occur in case of overdosing of the coffee in the filter, due to a relatively high flow resistance.

SUMMARY OF THE INVENTION

It is an objective of the present invention to provide a beverage maker having a water reservoir and a beverage extract holder, in which clogging of the outlet of the water reservoir with scale particles is prevented and/or in which overflow of the beverage extract holder cannot occur. This objective is achieved by a beverage maker which comprises a movably arranged water flow restriction member which is adapted to determine a size of the outlet opening of the water reservoir on the basis of its position with respect to the water reservoir; and a mechanical construction for connecting the water flow restriction member to the beverage extract holder.

The beverage maker according to the present invention comprises a movably arranged water flow restriction member which is mechanically connected to the beverage extract holder. Based on an insight that a weight of the beverage extract holder is closely related to a fluid filling grade of the beverage extract holder, overflow of the beverage extract holder may be avoided under all circumstances, namely when the mechanical connection between the water flow restriction member and the beverage extract holder is such that an increasing weight of the beverage extract holder causes the water flow restriction member to decrease the size of the outlet opening of the water reservoir. Advantageously, the water flow restriction member is capable of decreasing the size of the outlet opening of the water reservoir until this opening is completely blocked, wherein the relation between the weight of the beverage extract holder and the position of the water flow restriction member is such that a blocked condition of the outlet opening of the water reservoir is obtained before the fluid filling grade of the beverage extract holder is 100%.

Preferably, at least a portion of the water flow restriction member is movable through the outlet opening of the water reservoir, as in that case, the water flow restriction member may also have a function in removing contaminating particles from the outlet opening of the water reservoir in case such particles are present there.

In a practical embodiment of the beverage maker according to the present invention, at least a portion of the water flow restriction member is shaped like a cone, wherein the cone-shaped portion is movable through the outlet opening of the water reservoir. In this way, the above-mentioned function in removing contaminating particles of the water flow restriction member may be very well realized. Furthermore, on the basis of the fact that a diameter of a cone is variable along its height, the size of an opening through which a cone is moved is easily adjustable by varying the position of the cone in the opening. In general, when a cone is moved with its tip in a forward position, and the cone is moved deeper through an opening, the size of the opening decreases.

Within the scope of the present invention, various embodiments of the mechanical construction for connecting the water flow restriction member to the beverage extract holder are feasible. In a preferred embodiment, the construction comprises a lever which is rotatable about a rotation point located at a position between ends of the lever, wherein the beverage extract holder and the water flow restriction member are connected to the lever at different sides of the rotation point. In this reliable way, it is achieved that when the weight of the beverage extract holder increases, a pulling force of the beverage extract holder acting on one side of the lever increases, so that the lever is inclined to rotate about the rotation point, and a pushing force is obtained at the other side of the lever, which is the side where the water flow restriction member is located. Hence, when the fluid filling grade of the beverage extract holder increases, it is achieved that the water flow restriction member is pushed further through the outlet opening of the water reservoir, which leads to a decrease of the size of this opening, assuming that the portion of the water flow restriction member moving though this opening has an appropriate shape such as the above-described cone shape.

Preferably, the beverage maker according to the present invention further comprises a resilient element such as a spring for limiting a movement of the lever by connecting the lever to a fixed point. On the basis of the application of such a resilient element, a free movement of the lever is prevented, wherein a displacement of the water flow restriction member under the influence of a weight change of the beverage extract holder may be kept within acceptable limits. A maximum fluid filling grade of the beverage extract holder is influenced by the characteristics of the resilient element, such that the maximum fluid filling grade is higher when the stiffness of the resilient element is higher.

Advantageously, a shape of the water flow restriction member and characteristics of the mechanical construction for connecting the water flow restriction member to the beverage extract holder are adapted to realize a state of equilibrium in which a flow of water through the outlet opening of the water reservoir practically equals a flow of beverage through the outlet opening of the beverage extract holder. In this way, the highest possible flow rate of water through the beverage extract holder may be achieved, while overflow of the beverage extract holder is avoided. An important advantage of the highest possible flow rate as mentioned is that in the process of making a beverage, an extraction time may be as short as possible. In case the beverage is coffee, for example, and the water flows through an amount of ground coffee beans, a short extraction time leads to a desirable mild taste of the coffee.

The above-described and other aspects of the present invention will be apparent from and elucidated with reference to the following description of a beverage maker according to the present invention.

BRIEF DESCRIPTION OF THE DRAWING

The present invention will now be explained in greater detail with reference to

FIG. 1, which shows a number of components of a beverage maker according to the present invention.

DETAILED DESCRIPTION OF AN EMBODIMENT

FIG. 1 shows a number of components of a beverage maker according to the present invention, which is not shown as a whole. In the following, it is assumed that the beverage maker is a coffee maker, which does not alter the fact that the present invention is just as well applicable in the field of other types of beverage makers.

The coffee maker comprises a water reservoir 1 and a filter holder 2, wherein, in a normal orientation as illustrated by FIG. 1, the filter holder 2 is positioned underneath the water reservoir 1. The water reservoir 1 serves for containing water which is heated during operation of the coffee maker, and which is supplied to the filter holder 2 through an outlet opening 3. It is noted that during operation of the coffee maker, a disposable filter (not shown) containing an amount of ground coffee beans is positioned in the filter holder 2, wherein coffee is obtained on the basis of an interaction between the hot water and the ground coffee beans. For the purpose of allowing the coffee to exit the filter holder 2, the filter holder 2 comprises at least one outlet opening 4 which is positioned at a bottom 5 of the filter holder 2.

The coffee maker further comprises a water flow restriction member 6 having a cone-shaped portion 7, and a mechanical construction 8 for connecting the water flow restriction member 6 to the filter holder 2. The mechanical construction 8 comprises a lever 9, wherein the filter holder 2 is connected to one end of the lever 9, and wherein the water flow restriction member 6 is connected to another end of the lever 9. Furthermore, the lever 9 is rotatable about a rotation point 10, wherein the lever 9 is connected to this rotation point 10 at a position between its ends. In the shown example, the rotation point 10 is located on a suspension element 11 which is fixedly connected to the water reservoir 1. At a position between the connection to the rotation point 10 and the end supporting the water flow restriction member 6, the lever 9 is connected to a fixed point 12 through a spring 13, wherein, in this example, the fixed point 12 is located on the water reservoir 1.

It follows from the foregoing that, at a side where the filter holder 2 is connected to the lever 9, the filter holder 2 is suspended from the water reservoir 1. FIG. 1 shows that, at another side, the filter holder 2 is supported on a support 14 of the coffee maker.

During operation of the coffee maker, a process as will be described in the following takes place. It is assumed that at the start of the operation of the coffee maker, the filter holder 2 contains a filter filled with a certain amount of ground coffee beans, and that the water reservoir 1 contains an amount of water which is sufficient for making coffee on the basis of an interaction between the water and the ground coffee beans.

Inside the water reservoir 1, a valve (not shown) is present, which is adapted to prevent a water flow through the outlet opening 3 in a closed position and to allow a water flow through the outlet opening 3 in an opened position. During a process of heating the water, the valve is kept in a closed position. Furthermore, the coffee maker comprises sensor/switching means (not shown) which are adapted to detect a water temperature in the water reservoir 1 and to control the position of the valve. In case it appears that the temperate of the water has reached a suitable value, i.e. in case it appears that the water is sufficiently hot, the valve is put to the opened position, so that the outlet opening 3 is clear and the water is allowed to flow through the opening 3 and fall into the filter filled with an amount of ground coffee beans, which is located in the filter holder 2. At the start of this process, the water flow restriction member 6 is in a position as shown in FIG. 1, in which the water flow restriction member 6 does not limit the size of the outlet opening 3 of the water reservoir 1 in any way. Hence, the water is supplied to the filter holder 2 at a maximum flow rate.

As a result of the fact that the water is not allowed to flow freely through the outlet opening 4 which is positioned at the bottom 5 of the filter holder 2, but needs to flow through the ground coffee beans and the filter first, a situation in which the inflow of water in the filter holder 2 is larger than an outflow of coffee from the filter holder 2 is realized. The presence of an amount of fluid in the filter holder 2 leads to an increase of the weight of the filter holder 2. At a certain point, a pulling force that is exerted by the filter holder 2 on the lever 9 is so high that the lever 9 rotates against the action of the spring 13, wherein the end of the lever 9 supporting the water flow restriction member 6 moves in an upward direction, i.e. in a direction towards the outlet opening 3 of the water reservoir 1. In the process, a tip of the cone-shaped portion 7 of the water flow restriction member 6 enters the outlet opening 3 of the water reservoir 1, and a top portion of the cone-shaped portion 7 moves through the outlet opening 3 until a new state of equilibrium is realized.

In the new state of equilibrium, the flow of water from the water reservoir 1 to the filter holder 2 is restricted, as the outlet opening 3 of the water reservoir 1 is partly filled with the top portion of the cone-shaped portion 7 of the water flow restriction member 6. Advantageously, characteristics of the mechanical construction 8, including characteristics of the spring 13, and the shape of the cone-shaped portion 7 of the water flow restriction member 6 are chosen such that a situation in which the inflow of water in the filter holder 2 is practically equal to an outflow of coffee from the filter holder 2 is realized. Hence, an overflow of the filter holder 2 cannot occur, while a highest possible flow rate of the water is maintained. The latter is advantageous in view of the fact that an extraction time may be as short as possible, which has a positive influence on a taste/aroma of the coffee.

Every time the inflow of water in the filter holder 2 is different from the outflow of beverage from the filter holder 2, the lever 9 rotates such that a new state of equilibrium is realized, which leads to an appropriate adjustment of the flow of water from the outlet opening 3 of the water reservoir 1 on the basis of an appropriate adjustment of a position of the cone-shaped portion 7 of the water flow restriction member 6 in the opening 3. Overflow of the filter holder 2 is prevented at all times, as at a certain fluid filling grade of the filter holder 2, which is still less than 100%, the weight of the filter holder 2 is so high that the outlet opening 3 of the water reservoir 1 gets completely blocked by the water flow restriction member 6.

Speaking in overall terms, it is achieved that when the fluid filling grade and the weight of the filter holder 2 increase, the cone-shaped portion 7 of the water flow restriction member 6 moves further through the outlet opening 3 of the water reservoir 1 and restricts the flow of water from the water reservoir 1 to a larger extent, and when the fluid filling grade and the weight of the filter holder 2 decrease, the cone-shaped portion 7 of the water flow restriction member 6 is refracted and restricts the flow of water from the water reservoir 1 to a smaller extent. Due to the mechanical connection of the water flow restriction member 6 to the filter holder 2, the water flow restriction member 6 responds to the weight of the filter holder 2, and a relation between the fluid filling grade of the holder 2 and a size of the outlet opening 3 of the water reservoir 1 is realized. A stiffness of the spring 13 is a determining factor in respect of a maximum allowable fluid filling grade of the filter holder 2, i.e. a threshold value of the weight of the filter holder 2 which is related to a complete blockage of the outlet opening 3 of the water reservoir 1.

Besides the prevention of overflow of the filter holder 2 and the realization of an optimal water flow rate, another advantage is worth mentioning, namely the fact that the cone-shaped portion 7 of the water flow restriction member 6 has a function in keeping the outlet opening 3 of the water reservoir 1 free from contamination. In particular, during use of the coffee maker, scale particles may deposit in the opening 3. However, when the top portion of the cone-shaped portion 7 of the water flow restriction member 6 enters the opening 3, possible scale particles are detached and thereby removed from the opening 3. In tests which have been performed in relation to the present invention, it has been found that on the basis of this advantageous effect of the application of a water flow restriction member 6 which is arranged such as to be movable through the outlet opening 3 of the water reservoir 1, the opening 3 stays open for at least 800 coffee making cycles. Furthermore, it has appeared that an extraction value of the coffee of 1.4% can be achieved for various amounts of coffee, with an average extraction time of 3 minutes, which are very good results. Extraction value refers to the percentage of solids that has been dissolved in the coffee.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such an illustration and description are to be considered illustrative or exemplary only, and not restrictive. The present invention is not limited to the disclosed embodiment.

Variations to the disclosed embodiment can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the foregoing, a beverage maker has been described, which comprises a water reservoir 1 and a beverage extract holder 2 which is adapted to accommodate an amount of beverage extract, whether contained in a filter or not, which is suitable for containing an amount of fluid, which has at least one outlet opening 4 for letting out beverage, and which is arranged at a position for receiving water from an outlet opening 3 of the water reservoir 1. Furthermore, the beverage maker comprises a movably arranged water flow restriction member 6 which is adapted to determine a size of the outlet opening 3 of the water reservoir 1. The water flow restriction member 6 is mechanically connected to the beverage extract holder 2, wherein an increasing weight of the beverage extract holder 2, which is the result of an increasing fluid filling grade of the beverage extract holder 2, causes an increasing restriction of the outlet opening 3 of the water reservoir 1. Eventually, in case an outflow of beverage from the beverage extract holder 2 is considerably smaller than an inflow of water in the beverage extract holder 2, or even absent in case of a blockage of the outlet opening 4 of the beverage extract holder 2, the outlet opening 3 of the water reservoir 1 may be completely blocked in order to prevent the beverage extract holder 2 from overflowing. Furthermore, the application of the water flow restriction member 6 offers the possibility of achieving a situation in which the inflow of water in the beverage extract holder 2 is practically equal to the outflow of beverage from the beverage extract holder 2, so that an extraction time which is as short as possible may be realized. In case the beverage is coffee, this has a positive influence on the taste/aroma of the coffee.

The water flow restriction member 6 may be arranged such as to be movable in and out of the outlet opening 3 of the water reservoir 1, and may comprise a cone-shaped portion 7, for example. When such a water flow restriction member 6 is used, yet another advantage is that the water flow restriction member 6 may have a function in keeping the opening 3 free from scale particles and/or other contaminating particles.

The invention claimed is:

1. Device for making a beverage, comprising:
    a water reservoir having at least one outlet opening for letting out water;
    a beverage extract holder which is intended to be filled with an amount of beverage extract, whether contained in a filter or not, which is suitable for containing an amount of fluid, which has at least one outlet opening for letting out beverage, and which is arranged at a position for receiving water from the outlet opening of the water reservoir;
    a movably arranged water flow restriction member which is in communication with the water reservoir and beverage extract holder and is adapted to determine a size of the outlet opening of the water reservoir on the basis of its position with respect to the water reservoir and on the weight of the beverage extract holder, wherein an increasing weight of the beverage extract holder causes the water flow restriction member to decrease the size of the outlet opening of the water reservoir.

2. Beverage maker according to claim 1, wherein at least a portion of the water flow restriction member is movable through the outlet opening of the water reservoir.

3. Beverage maker according to claim 1, wherein at least a portion of the water flow restriction member is shaped like a cone, and wherein the cone-shaped portion is movable through the outlet opening of the water reservoir.

4. Beverage maker according to claim 1, wherein the mechanical construction for connecting the water flow restriction member to the beverage extract holder comprises a lever which is rotatable about a rotation point located at a position between ends of the lever, and wherein the beverage extract holder and the water flow restriction member are connected to the lever at different sides of the rotation point.

5. Beverage maker according to claim 4, further comprising a resilient element such as a spring for limiting a movement of the lever by connecting the lever to a fixed point.

6. Beverage maker according to claim 1, wherein the water flow restriction member is adapted to realize a state of equilibrium with the beverage extract holder, wherein said state of equilibrium comprises a flow of water through the outlet opening of the water reservoir substantially equalling a flow of beverage through the outlet opening of the beverage extract holder.

* * * * *